US012566771B2

(12) United States Patent     (10) Patent No.:    US 12,566,771 B2

Huang et al.               (45) Date of Patent:       Mar. 3, 2026

---

(54) DYNAMICALLY SUPPRESSING QUERY ANSWERS IN SEARCH

(71) Applicant: Microsoft Technology Licensing, LLC, Redmond, WA (US)

(72) Inventors: Zicheng Huang, Bothell, WA (US); Mridu Baldevraj Narang, Redmond, WA (US); Ling Li, Bellevue, WA (US); Guihong Cao, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 134 days.

(21) Appl. No.: 17/513,827

(22) Filed: Oct. 28, 2021

(65) Prior Publication Data

US 2022/0050833 A1     Feb. 17, 2022

Related U.S. Application Data

(63) Continuation of application No. 16/160,886, filed on Oct. 15, 2018, now abandoned.

(51) Int. Cl.
    G06F 16/248       (2019.01)
    G06F 16/2455     (2019.01)
    G06F 16/9535     (2019.01)

(52) U.S. Cl.
    CPC ...... G06F 16/248 (2019.01); G06F 16/24564 (2019.01); G06F 16/9535 (2019.01)

(58) Field of Classification Search
    None
    See application file for complete search history.

(56) References Cited

U.S. PATENT DOCUMENTS 10,929,390 B2    2/2021   Fu et al.
2004/0260695 A1*   12/2004   Brill .................... G06F 16/9535
                                707/999.005

(Continued)

FOREIGN PATENT DOCUMENTS

CN     101076800 A    11/2007
CN     108027820 A     5/2018
WO   2015183702 A1   12/2015

OTHER PUBLICATIONS

Yifan Jin; A Filter-based Protocol for Continuous Queries over Imprecise Location Data; CIKM;2012; pp. 365-374.*

(Continued)

*Primary Examiner* — Ann J Lo
*Assistant Examiner* — Jermaine A Mincey
(74) *Attorney, Agent, or Firm* — CALFEE, HALTER & GRISWOLD LLP

(57)            ABSTRACT

A method for determining whether to dynamically suppress a candidate query answer designated for inclusion in search results includes instantiating a plurality of filtering rules for assessing suppression of a candidate query answer. The filtering rules include one or both of a pattern rule and a site rule. The method further comprises receiving a query, and, after receiving the query, retrieving one or more candidate query answers previously associated with the query. The method further comprises, for each candidate query answer, dynamically suppressing the candidate query answer from a curated position having enhanced prominence within search results relative to a plurality of other result entries, if either or both of a pattern rule and a site rule match the query. The method further includes returning search results including up to one candidate query answer in the curated position, responsive to a candidate query answer not being dynamically suppressed.

20 Claims, 7 Drawing Sheets

(56) References Cited

U.S. PATENT DOCUMENTS

| | | | |
|---|---|---|---|
| 2006/0026147 | A1 | 2/2006 | Cone et al. |
| 2006/0041597 | A1* | 2/2006 | Conrad .................. G06F 16/30 |
| 2011/0060733 | A1 | 3/2011 | Peng et al. |
| 2012/0124149 | A1 | 5/2012 | Gross et al. |
| 2013/0066889 | A1 | 3/2013 | Rodriguez et al. |
| 2013/0304742 | A1 | 11/2013 | Roman et al. |
| 2018/0181677 | A1 | 6/2018 | Wei |
| 2018/0218079 | A1* | 8/2018 | Li ......................... G06F 16/335 |
| 2018/0365318 | A1* | 12/2018 | Yi ......................... G06F 16/334 |
| 2020/0117742 | A1 | 4/2020 | Huang et al. |

OTHER PUBLICATIONS

"Final Office Action Issued in U.S. Appl. No. 16/160,886", Mailed Date: Jun. 28, 2022, 29 Pages.

"International Search Report and Written Opinion Issued in PCT Application No. PCT/US19/049403", Mailed Date: Oct. 31, 2019, 13 Pages.

Tiedemann, Jorg, "Automatic Construction of Weighted String Similarity Measures", In Joint SIGDAT Conference on Empirical Methods in Natural Language Processing and Very Large Corpora, 1999, pp. 213-219.

"Non-Final Office Action for U.S. Appl. No. 16/160,886", Mailed Date: Sep. 30, 2020, 14 Pages.

"Reply to Non-Final Office Action for U.S. Appl. No. 16/160,866", Filed Date: Dec. 30, 2020, 16 Pages.

"Final Office Action for U.S. Appl. No. 16/160,886", Mailed Date: Mar. 8, 2021, 27 Pages.

Pre-Appeal Brief Support Document for U.S. Appl. No. 16/160,866, filed Jun. 8, 2021, 5 Pages.

Notice of Panel Decision from Pre-Appeal Brief Review for U.S. Appl. No. 16/160,866, Mailed Date: Jul. 16, 2021, 2 Pages.

"Non Final Office Action Issued in U.S. Appl. No. 16/160,886", Mailed Date: Nov. 16, 2021, 27 Pages.

"Non-Final Office Action Issued in U.S. Appl. No. 16/160,886", Mailed Date: Jun. 26, 2023, 29 Pages.

Notice of Allowance Received for Chinese Application No. 201980067915.5, mailed on Oct. 28, 2024, 04 pages (English Translation Provided).

Final Office Action mailed on Feb. 28, 2024, in U.S. Appl. No. 16/160,886, 29 pages.

Office Action Received for Chinese Application No. 201980067915.5, mailed on Dec. 25, 2023, 12 pages (English Translation Provided).

* cited by examiner

FIG. 1A

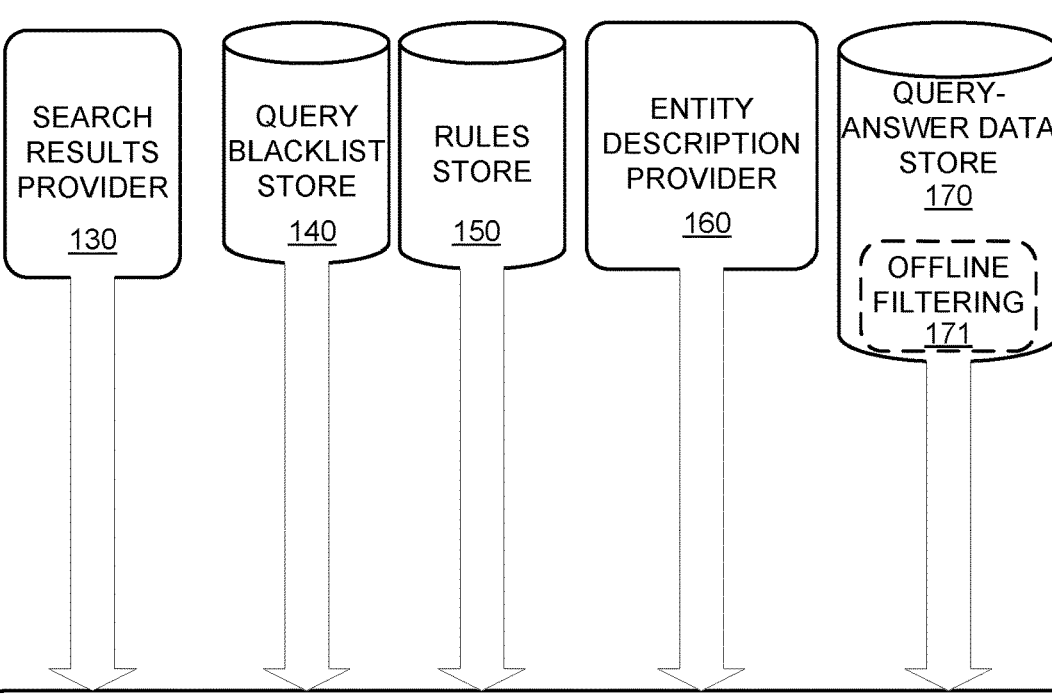

| SEARCH RESULTS PROVIDER 130 | QUERY BLACKLIST STORE 140 | RULES STORE 150 | ENTITY DESCRIPTION PROVIDER 160 | QUERY-ANSWER DATA STORE 170 |
|---|---|---|---|---|

OFFLINE FILTERING 171

SERVICE ENDPOINT 120

QUERY SUPPRESSION MACHINE 121

PATTERN SUPPRESSION MACHINE 122

SITE SUPPRESSION MACHINE 123

DUPLICATE CONTENT SUPPRESSION MACHINE 124

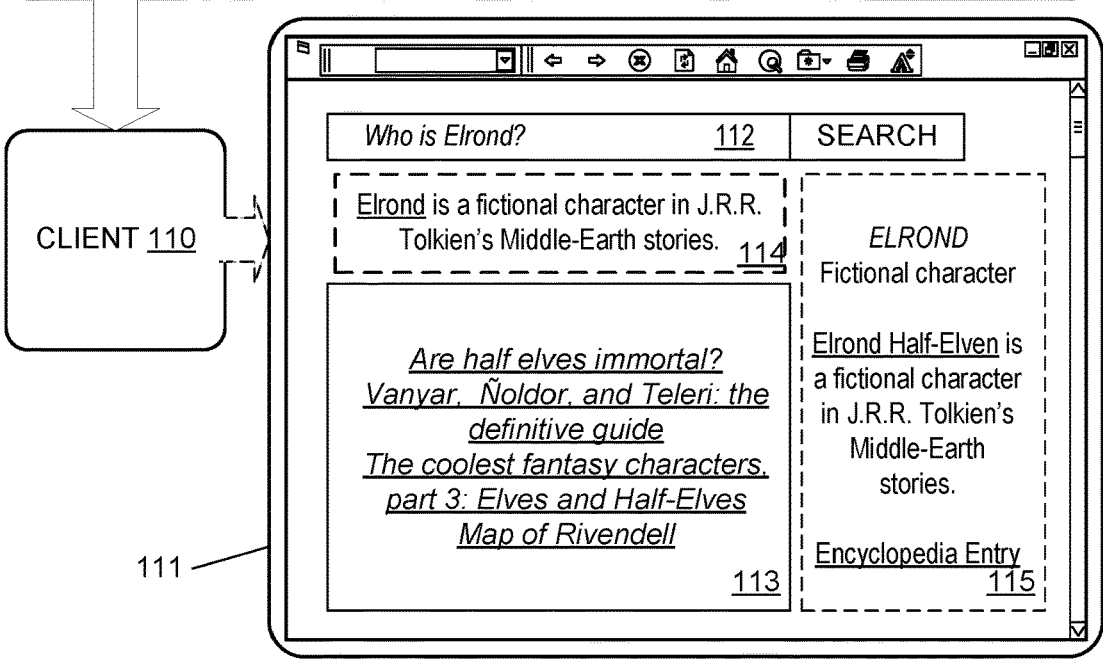

CLIENT 110

Who is Elrond?     112     SEARCH

Elrond is a fictional character in J.R.R. Tolkien's Middle-Earth stories. 114

*Are half elves immortal?*
*Vanyar, Ñoldor, and Teleri: the definitive guide*
*The coolest fantasy characters, part 3: Elves and Half-Elves*
*Map of Rivendell*
113

*ELROND*
Fictional character

Elrond Half-Elven is a fictional character in J.R.R. Tolkien's Middle-Earth stories.

Encyclopedia Entry
115

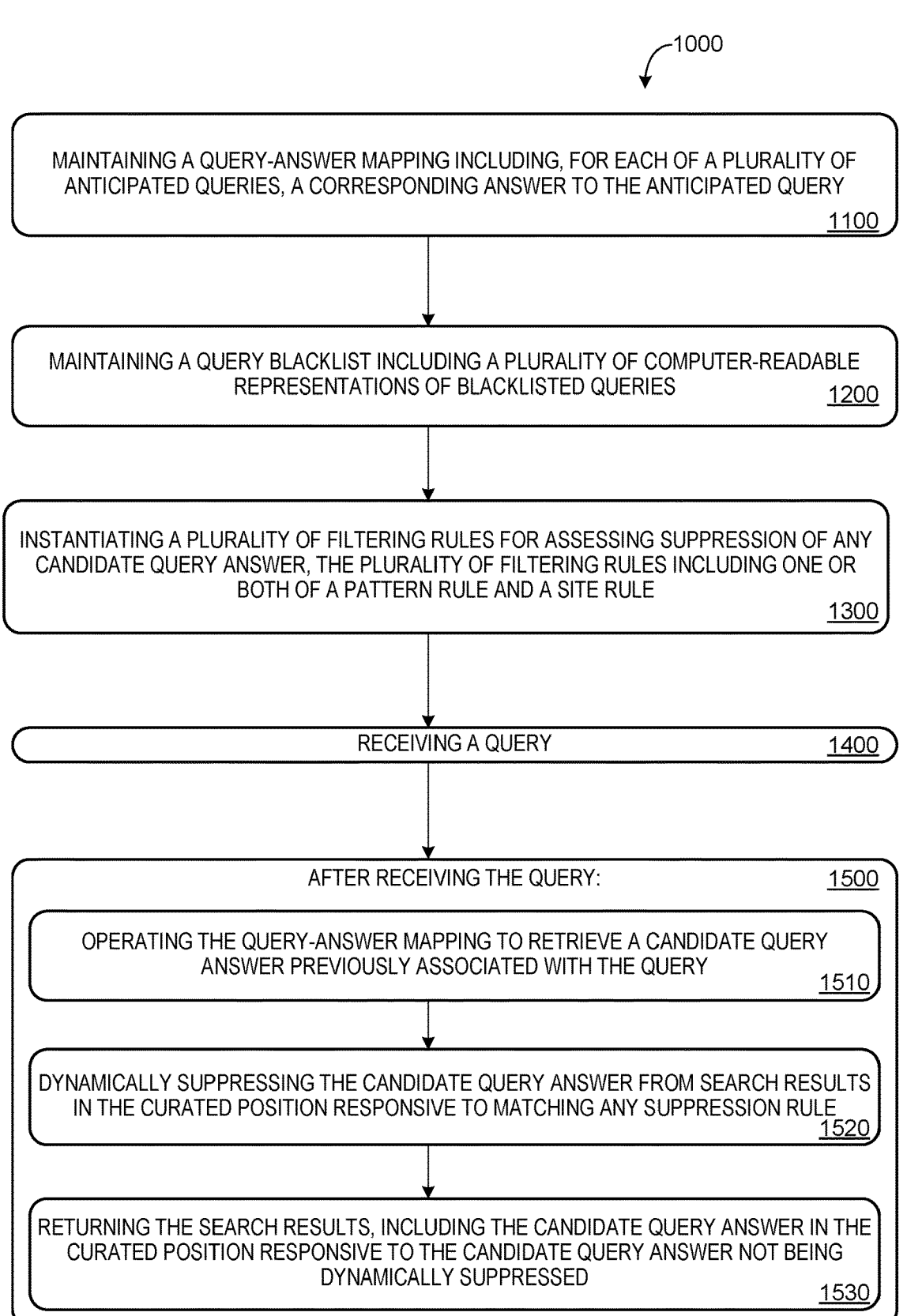

1000

MAINTAINING A QUERY-ANSWER MAPPING INCLUDING, FOR EACH OF A PLURALITY OF ANTICIPATED QUERIES, A CORRESPONDING ANSWER TO THE ANTICIPATED QUERY
1100

MAINTAINING A QUERY BLACKLIST INCLUDING A PLURALITY OF COMPUTER-READABLE REPRESENTATIONS OF BLACKLISTED QUERIES          1200

INSTANTIATING A PLURALITY OF FILTERING RULES FOR ASSESSING SUPPRESSION OF ANY CANDIDATE QUERY ANSWER, THE PLURALITY OF FILTERING RULES INCLUDING ONE OR BOTH OF A PATTERN RULE AND A SITE RULE
1300

RECEIVING A QUERY          1400

AFTER RECEIVING THE QUERY:          1500

OPERATING THE QUERY-ANSWER MAPPING TO RETRIEVE A CANDIDATE QUERY ANSWER PREVIOUSLY ASSOCIATED WITH THE QUERY
1510

DYNAMICALLY SUPPRESSING THE CANDIDATE QUERY ANSWER FROM SEARCH RESULTS IN THE CURATED POSITION RESPONSIVE TO MATCHING ANY SUPPRESSION RULE
1520

RETURNING THE SEARCH RESULTS, INCLUDING THE CANDIDATE QUERY ANSWER IN THE CURATED POSITION RESPONSIVE TO THE CANDIDATE QUERY ANSWER NOT BEING DYNAMICALLY SUPPRESSED
1530

FIG. 3C

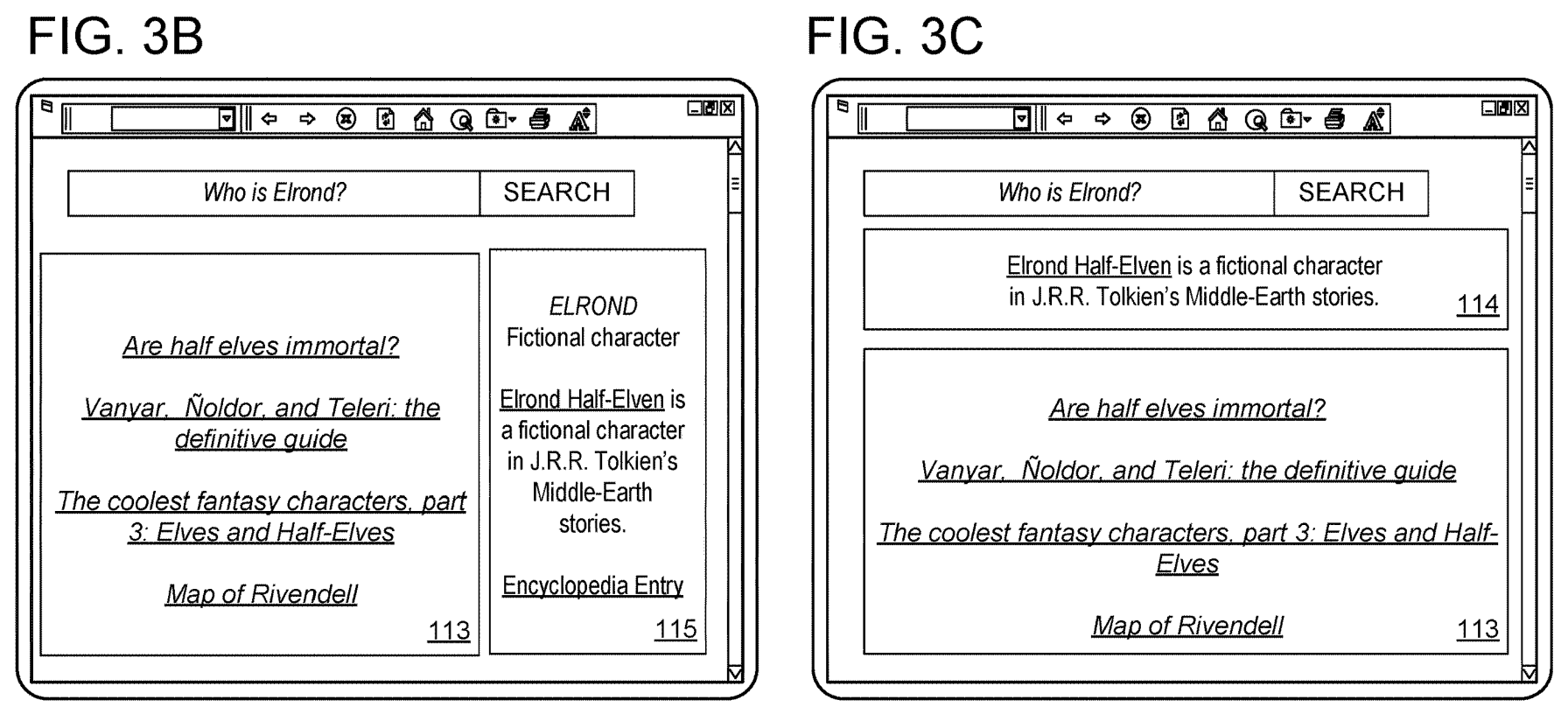

Who is Elrond? | SEARCH

Elrond Half-Elven is a fictional character in J.R.R. Tolkien's Middle-Earth stories.

__114__

*Are half elves immortal?*

*Vanyar, Ñoldor, and Teleri: the definitive guide*

*The coolest fantasy characters, part 3: Elves and Half-Elves*

*Map of Rivendell*

Who is Elrond? | SEARCH

*ELROND*
Fictional character

Elrond Half-Elven is a fictional character in J.R.R. Tolkien's Middle-Earth stories.

Encyclopedia Entry

__115__

*Are half elves immortal?*

*Vanyar, Ñoldor, and Teleri: the definitive guide*

*The coolest fantasy characters, part 3: Elves and Half-Elves*

*Map of Rivendell*

Figure 5:
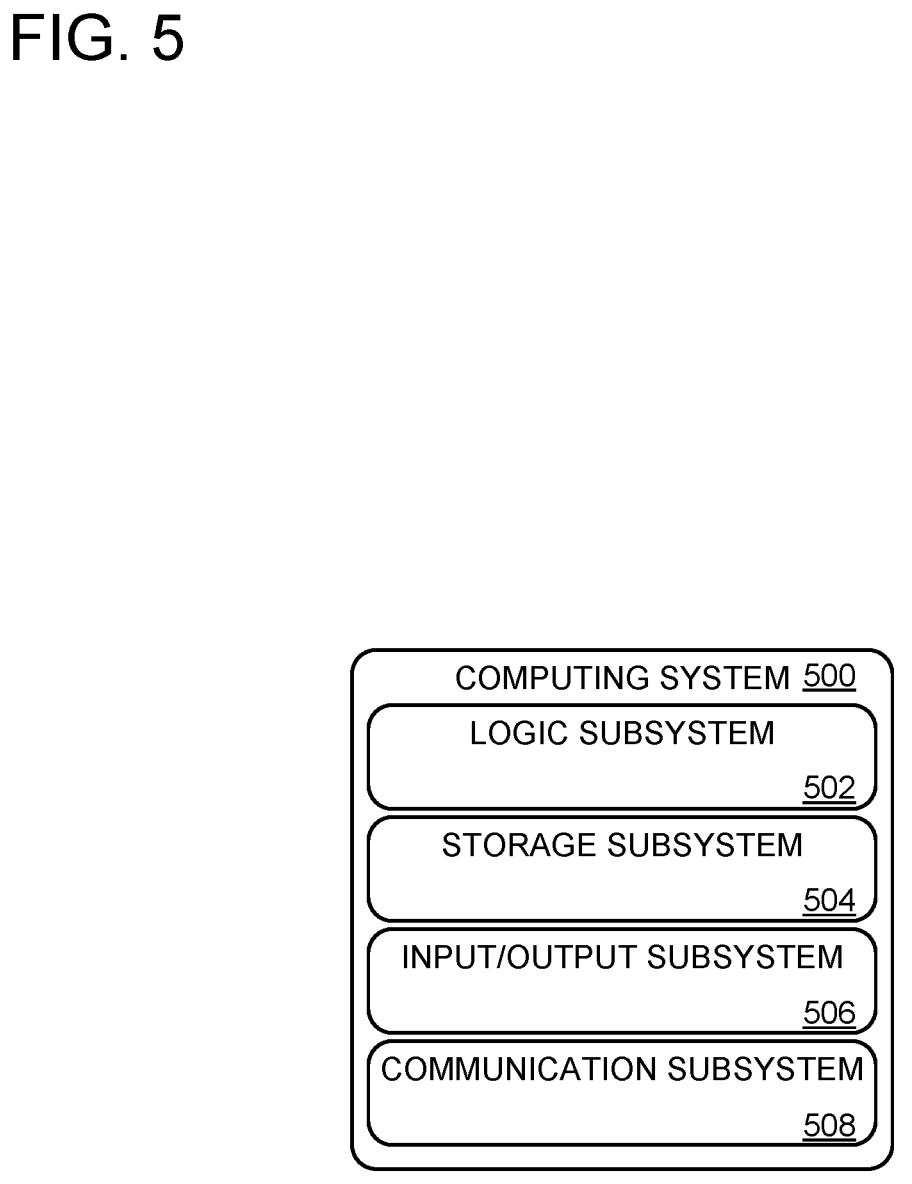

COMPUTING SYSTEM 500

LOGIC SUBSYSTEM

502

STORAGE SUBSYSTEM

504

INPUT/OUTPUT SUBSYSTEM

506

COMMUNICATION SUBSYSTEM

508

DYNAMICALLY SUPPRESSING QUERY ANSWERS IN SEARCH

RELATED APPLICATION

This application is a continuation of U.S. patent application Ser. No. 16/160,886, filed on Oct. 15, 2018, and entitled "DYNAMICALLY SUPPRESSING QUERY ANSWERS IN SEARCH". The entirety of this application is incorporated herein by reference.

BACKGROUND

Internet search engines and other search providers are typically designed to provide many different search results in response to search queries. Internet search engines may be configured to present individual ones of the results with different levels of prominence, for example, a set of web page links or a passage which can answer the query directly, thus making the search results easier for a user to digest.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for determining whether to dynamically suppress a candidate query answer designated for inclusion in search results includes instantiating a plurality of filtering rules for assessing suppression of a candidate query answer. The filtering rules include one or both of a pattern rule and a site rule. The method further comprises receiving a query. A mapping of such queries to query answers is maintained for each of a plurality of anticipated queries. After receiving the query, one or more candidate answers (e.g., query answers previously associated with the query) are retrieved. The method further comprises, for each candidate query answer, dynamically suppressing the candidate query answer from a curated position having enhanced prominence within search results relative to a plurality of other result entries, if either or both of a pattern rule and a site rule match the query. The method further includes returning search results including up to one candidate query answer in the curated position, responsive to a candidate query answer not being dynamically suppressed.

BRIEF DESCRIPTION OF THE DRAWINGS

FIG. 1A shows an exemplary system architecture for suppressing query answers from search results.

FIG. 1B shows a method for providing search results with potential suppression of query answers.

FIGS. 3A-3C show search results with suppression of query answers and/or entity descriptions.

FIG. 5 shows an exemplary computing system.

DETAILED DESCRIPTION

Figure 2:
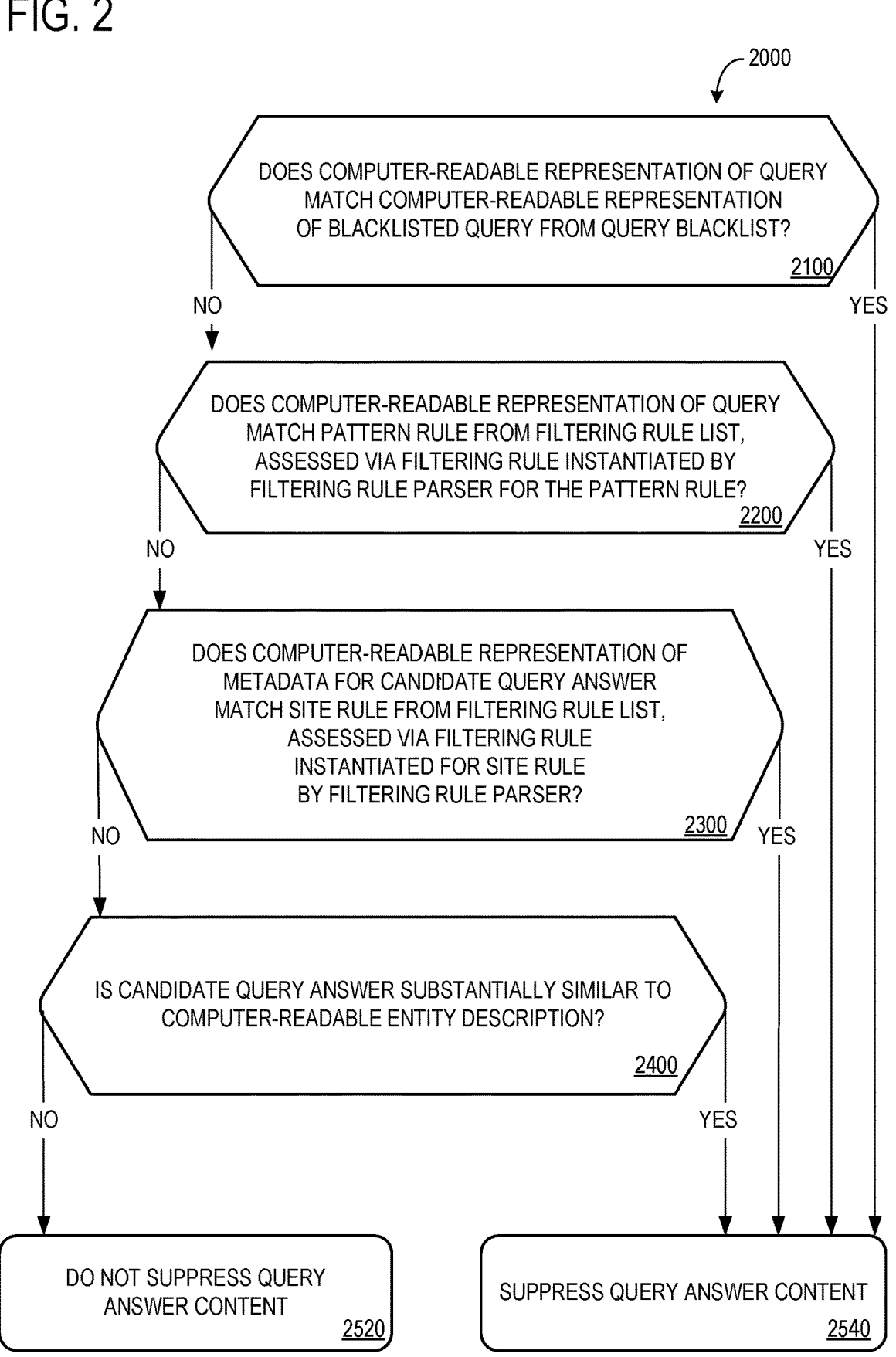
FIG. 2 shows a method for determining whether to suppress a query answer from search results.

Search results may include a query answer in the form of a natural language response to a question posed in a query (e.g., presented as text or speech audio). In addition to query answers, search results may include any other suitable result entries, e.g., web search results, keyword-based search results, advertisements, descriptions of entitieslevents/ places in the search query, etc. In some examples, a query answer or another result entry (e.g., an entity description) may be presented in a curated position having enhanced prominence relative to other result entries. However, in some cases, one or more of the result entries may not be desired for inclusion in the curated position. Accordingly, the present disclosure is directed to a methodology for determining whether to suppress certain result entries in search results when providing search functionality, e.g., for suppressing query answers and/or entity descriptions that may be redundant in view of other result entries among the search results. Suppression of a result entry that would be shown in a curated position may include removing the result entry from the (waled position, e.g., by demoting the result entry to be shown in a different position without as much prominence, or by removing the result entry altogether.

FIG. 1A shows a non-limiting example of an architecture for providing search results to a client. Search functionality may be provided by the architecture shown in FIG. 1A or by any other suitable architecture for providing search results. For example, the search architecture may allow a client computer 110 to perform searches using any suitable queries (e.g., natural language keywords, regular expression patterns, Boolean operators for composing multiple queries, etc.), on any suitable search domain (e.g., web site(s), encyclopedia(s), database(s), financial/medical/scientific records, etc.). The devices shown in FIG. 1A may be communicatively coupled in any suitable fashion to enact the datafiow shown by arrows in FIG. 1A, e.g., by communicatively coupling to a suitable computer network, such as the Internet.

Client computer 110 may be any suitable computing device, e.g., a mobile phone, personal computer, intelligent assistant speaker device, etc. Client computer 110 optionally may include a display device configured to present a browser 111. Browser 111 may be configured to present one or more pages, e.g., a search page configured to allow a user to input search queries and/or view search results, as shown in FIG. 1A. Alternately or additionally, client computer 110 may allow a user to input search queries and/or receive search results in any other suitable fashion, e.g., client computer 110 may include a microphone and speaker and may be configured to receive queries via natural language speech utterances received at the microphone, and to output search results via speech audio output at the speaker. Although the present disclosure may be described in terms of a graphical browser 111 as shown in FIG. 1A, the methods and processes disclosed herein may be implemented in the context of any other search interface, e.g., a speech-based natural language search interface.

The search interface may include a search input field configured to receive user input representing a user query, e.g., search bar 112 is configured to receive user text. The search interface may further include an affordance configured to submit the query in order to receive search results, e.g., the "SEARCH" button. After the user inputs a query, browser 111 sends a computer-readable representation of the query to a service endpoint 120 in order to receive search results from the service endpoint. For example, the user submits a query "Who is Elrond?". In addition to main results 113, the search results may optionally include additional result entries designated for presentation in a curated position of the search results having enhanced prominence within search results relative to other result entries (e.g., a privileged position). For example, as shown in FIG. 1A, search results may optionally further include query answer 114 in a first curated position and/or entity description 115 in a second curated position. A ciliated position may be designated and/or given enhanced prominence in any suitable fashion. Non-limiting examples for curated positions for search results include: 1) as a first result entry in a list of result entries; 2) near the top of a search result page (e.g., immediately under a search bar as with query answer 114); 3) as a left- or right-sidebar of a search result page (e.g., at the right as with entity description 115); 4) in a separate page (e.g., pop-up, dialog box, and/or new tab); 5) in a separate frame of a search results page; 6) within an outlined, shaded, or otherwise marked box; 7) within a region marked by a label indicating a type of curated result entry (e.g., a label indicating "query answer") and/or 8) within a section of a search result page that does not scroll when a scrollbar of the search result page is used to scroll other result entries. In some examples, search results may be presented in the form of audio and/or text dialog interaction. Accordingly, a curated position may be designated and/or given enhanced prominence by an audio and/or text announcement delimiting the start of a result entry in a curated position, by ordering of different result entries, etc.

Service endpoint 120 is configured, responsive to receiving the query, to return one or more search results for presentation in browser 111. Service endpoint 120 may be configured to serve "raw" queries in the form of literal text input by the user. Alternately or additionally, service endpoint 120 may be configured to serve "normalized" queries in the form of a computer-readable description of query content, e.g., by processing a computer-readable description indicating an intent of a query representing a question, goal, and/or task of the user indicated by the query, by processing one or more entities in the query, and/or a by processing syntactic structure of a query (e.g., a parse tree for the query). Query normalization may be performed by any suitable computer device(s), e.g., by client computer 110 and/or service endpoint 120. Normalized queries may include relevant informational content of a query (e.g., relevant intents/entities) while limiting the amount of variability among queries (e.g., different raw queries that are rephrasings of the same question may be normalized into the same normalized query).

The search results include main results 113 which include various web sites that may be related to the user query. Although FIG. 1A shows an example of web search, a service endpoint 120 may be configured to return results from any other suitable domain. Service endpoint 120 may return search results based on data received from one or more other computers. For example, service endpoint 120 may cooperate with a search results provider 130 to send a search query to the search results provider 130 and receive main results 113 for a user query, which may include relevant web sites, documents, etc., as desired for the search domain. Accordingly, search results provider 130 may be configured to determine relevant search results for a query in any suitable fashion, e.g., by searching in a database, indexing/scraping web sites or documents, etc.

Non-limiting examples of search result entries include query answers, entity descriptions, and non-curated search results. Alternately or in addition to query answers, entity descriptions, and/or non-curated search results, search results may include any other suitable curated and/or non-curated content which may be presented in a curated position (e.g., in a distinct curated position separate from query answers and entity descriptions). Non-limiting examples of other types of result entries that may be included in search results include: news search results, image search results, video search results, shopping search results, recipe search results, etc. Although the present description is with regard to suppression of query answers and/or entity descriptions, the methods of the present disclosure may be used to determine whether to suppress and/or include any type of curated and/or non-curated result.

Query answers are direct responses to one or more questions posed within a query, e.g., in the form of a natural language response which may include any suitable content such as one or more text passages containing information that is responsive to the question (e.g., pertinent, relevant, accurate, concise, and/or clearly-worded response(s) to the question). In some examples, query answers may only be provided when a query expresses a question (e.g., when the query is in the form of a natural language question), and may not be provided for general searches (e.g., a query answer may not be provided when a search consists only of keywords without any syntactic structure or question-related words). Query answers may be selected based on intents expressed by the user's question, e.g., to satisfactorily address each aspect of the user's question. Query answers may be particularly suitable for responding to queries in the context of an audio and/or text dialog, since they may help the user to answer a question without looking through multiple other result entries. Entity descriptions are collections of descriptive information about an entity mentioned in a query.

Entity descriptions provide potentially relevant information about people, places, things, events, etc., that are mentioned anywhere within a query. For example, if a query includes a list of keywords and one of the keywords is the name of a famous person, search results provided for the query may include an entity description about the famous person. Entity descriptions are typically not in the form of a natural language answer to a question, and instead may include a collection of any suitable information about the relevant entity. Non-limiting examples of information for entity descriptions may include biographic information, historical information, photos, videos, audio clips, etc.

Non-curated search results include results from keyword-based search, web search, database search, etc., that are not configured to adhere to a curated format such as a query answer or entity description. For example, browser 111 shows main results 115 including a plurality of non-curated results. Non-curated results may be relevant, to a query without necessarily satisfying any particular relationship to the query, e.g., a non-curated result may not be in the form of an answer to a question, and may not describe any particular entity named in the query. A non-curated result may be presented in the form of a title, link URL, and/or short summary and/or snippet of content from the non-curated result (e.g., a snippet of a web page). In contrast to query answers, a user may need to navigate to a different page to view relevant content from non-curated results, requiring navigation and redirection of attention away from search results to get to relevant information.

Query answer 114 includes a direct answer to the user's query, "Who is Elrond?". Query answers may be any curated and/or specially selected content that may be particularly pertinent to a user's search query. For example, when the search query is in the form of a question, a query answer may be in the form of a direct reply to that question, as shown in query answer 114. Presenting relevant query answers may save the user time and/or improve an efficiency of client computer 110 and/or service endpoint 120 in providing search results. For example, providing a relevant query answer may mitigate a need for the user to conduct repeated web searches and/or scroll through a large amount of search results, in order to successfully answer a question. In some examples, query answers are pre-associated with queries that are likely to be received at service endpoint 120. Accordingly, service endpoint 120 is configured to receive query answers from a query-answer data store 170.

Query-answer data store 170 is configured to maintain a query-answer mapping including, for each of the plurality of anticipated queries, a corresponding answer to the antici-pated query. Although the present disclosure is described in terms of a query-answer mapping that includes one answer for each anticipated query, alternately the query-answer mapping may include more than one candidate answer for each anticipated query. In some examples, more than one answer may be retrieved for a given query in order to return, in search results, more than one query answer for inclusion in a curated position. In some examples, more than one answer may be retrieved so as to rank and/or select from the candidate answers, e.g., in order to return a best query answer for inclusion in the curated position. Query-answer data store 170 may maintain the association with regard to raw and/or normalized queries, e.g., looking up a query answer in the query-answer mapping may include looking up a raw query string and/or looking up a computer-readable representation of a normalized query. Query-answer data store 170 may determine associations in the query-answer mapping in any suitable fashion, e.g., based on natural language models, data mining/web scraping, etc. Using pre-associated queries/answers in query-answer mapping may improve efficiency of retrieving query answers (e,g., since query answers are substantially pre-computed for a query and are stored in a local, organized fashion in the query-answer mapping), and/or robustness/quality of answers (e.g., since the answers in the query-answer map-ping may be audited/validated to assess and improve qual-ity). Alternately or additionally to using pre-associated map-pings between search queries and search results, query-answer data store 170 may provide answers to queries in any other suitable fashion, e.g., in real time based on data scraped from web sites, etc.

Entity description 115 includes a description of one or more entities mentioned in the user's query. For example, since the user's query mentions "Elrond," entity description 115 includes a description of "Elrond" along with a link (e.g., a uniform resource locator (URL)) to an encyclopedia entry about "Elrond." Entity descriptions may be included in search results for any suitable entity or any other object, concept, or noun, e.g., fictional characters (as shown), real people, places, historical events, movies, music albums, etc. Entity descriptions may include any suitable descriptive content and/or links to other content. Entity descriptions may be determined in any suitable manner, for example, based on natural language processing, machine learning, artificial intelligence, data mining, and/or according to a previously-configured association between entity names and entity descriptions. In some examples, entity descriptions are received from an entity description provider 160 con-figured to receive a query from service endpoint 120 and to provide an entity description for one or more entities men-tioned in the query. For example, entity description provider 160 may maintain an association between entities and cor-responding entity descriptions, so that entity description(s) for a query may be returned by looking up entity names in the query.

In some examples, it may not be desired to include one or both of query answer 114 and/or entity description 115. In some examples, content in different sections of the search results (e.g., content in main results 113, query answer 114, and/or entity description 115) may be substantially dupli-cated, leading to redundant content in the search results. Accordingly, such redundant content may be suppressed from one or both of query answer 114 and/or entity descrip-tion 115. In some examples, content in query answer 114 and/or entity description 115 may not be desired (e.g., relevant, appropriate, and/or suitable) for a given query. For example, relevant results for the query may include possibly sensitive content (e.g., obscene content) which may not be appropriate for presentation in a prominent location in search results. Alternately or additionally, content may be indicated to be undesirable for inclusion in a query answer 114 and/or for inclusion in an entity description 115, based on user feedback (e.g., feedback indicating, for a given query and for search results shown for that query, that an entity description 115 and/or a query answer 114 is not appropriate and/or not helpful).

Accordingly, query answer 114 and/or entity description 115 may be suppressed from search results before presenting the search results in browser 111. In some examples, query-answer data store 170 may include an offline filtering mechanism 171 configured to suppress one or more possible query answers from search results, e.g., by removing such query answers from the query-answer mapping. However, such offline filtering may be slow and/or computationally intensive, as suppressing answers from the query-answer mapping may require processing a plurality of different candidate query-answer pairs (e.g., to find and modify each relevant query for which answers should be suppressed). Offline filtering may be particularly inappropriate when suppression of query answers is based on changing data regarding user queries, search results, and/or user satisfac-tion with query answers, as it may be infeasible to perform the offline filtering with sufficient frequency to ensure that search results reflect the changing data. Furthermore, query-answer data store 170 may be unaware of potentially rel-evant content that may be included in search results based on data received by service endpoint 120 from other machines in FIG. 1A, e.g., main results 113 from search results provider 130 and/or entity description 115 from entity. description provider 160. As such, query-answer data store 170 may not have sufficient information to suppress certain query answers that should be suppressed, e.g., a query answer 114 that substantially duplicates the content of an entity description 115 (as with the query answer 114 and entity description 115 shown in FIG. 1A).

Accordingly, service endpoint 120 is configured to dynamically suppress content from search results while preparing the search results for presentation at client com-puter 110, based on a submitted query as well as the main search results, query answer, and/or entity description for the query. By suppressing content based on the search query as well as all of the content which would (if not suppressed) be displayed in the search results, service endpoint 120 may be able to suppress content which would not be suppressed by an offline filtering mechanism 171. For example, service endpoint 120 may include a duplicate content suppression machine 124 configured to suppress duplicate content from one or more of a query answer 114 and/or an entity description 115, based on redundancy of such content within the search results. Service endpoint 120 may determine what content to dynamically suppress according to a query blacklist provided by a query blacklist store 140. Service endpoint 120 may further determine what content to dynamically suppress according to one or more rules provided by a rules store 150. The one or more rules may specify particular queries, sites, and/or answers and results may be suppressed based on matching the specified queries/sites/answers. Suppression of undesirable content may improve the functionality of service endpoint 120 and/or client computer 110 as well as other computers shown in FIG. 1A. For example, service endpoint 120 may not need to transfer as much data to client computer 110 since suppressed results need not be transferred. Furthermore, a user may more efficiently retrieve relevant results in fewer searches, with less transfer of data than if the user needed to carry out multiple searches to find relevant content, thereby reducing computational and network costs and effort for the user.

Accordingly, FIG. 1B shows a method 1000 for providing search results, while potentially suppressing content (e.g., query answers and/or entity descriptions) from the search results. Method 1000 may be performed by any suitable computer system, e.g., by any suitable combination of devices from the search provider architecture shown in FIG. 1A, e.g., by service endpoint 120 anchor client computer 110. Although method 1000 is described with regard to suppressing query answer anchor entity description content, method 1000 or a substantially similar method may be applied to suppress any other kind of content from search, e.g., to suppress one or more main search results, and/or to suppress different kinds of content from curated locations among the search results. Method 1000 may be performed, at least in part, by one or more machines instantiated by service endpoint 120 as shown in FIG. 1A. For example, service endpoint 120 may instantiate a query suppression machine 121, pattern suppression machine 122, site suppression machine 123, and/or duplicate content suppression machine 124. Although not shown in FIG. 1A, alternately or additionally to service endpoint 120, any other suitable combination of machines (e.g., client computer 110) may instantiate query suppression machine 121, pattern suppression machine 122, site suppression machine 123, and/or duplicate content suppression machine 124 to provide any functionality described herein.

At 1100, method 1000 includes maintaining a query-answer mapping, e.g., the query answer mapping in query-answer data store 170 as shown in FIG. 1A. The query-answer mapping is configured to include, for each of a plurality of anticipated queries, a corresponding answer to the anticipated query.

At 1200, method 1000 includes maintaining a query blacklist including a plurality of computer-readable representations of blacklisted queries. For example, the query blacklist may include a list of literal query strings. Service endpoint 120 is configured to instantiate a query suppression machine 121 configured to assess whether a received query matches any query in the blacklist. Matching a received query against a query in the blacklist may be based on an exact, literal comparison of the received query string to a query string in the blacklist. Alternately or additionally, queries may be matched via "fuzzy" matching (e.g., matching with at least a threshold similarity, such as a threshold proportion of matching words in the queries), probabilistic matching, and/or using a machine learning or natural language processing model. When a received query matches one of the blacklisted query strings, service endpoint 120 may suppress query answers for the query from search results.

At 1300, method 1000 includes instantiating a plurality of filtering rules for assessing whether to suppress any candidate query answer. In other words, the plurality of filtering rules are instantiated without regard to any particular query answer, and may be later assessed with regard to any given query answer to determine whether to suppress the given query answer. The plurality of filtering rules may include one or both of a pattern rule and/or a site rule. As shown in FIG. 1A, site and/or pattern rules may be maintained in rules store 150.

Service endpoint 120 is configured to instantiate a pattern suppression machine 122 configured to assess pattern rules with regard to a quety. Pattern rules are rules for suppressing a query based on text content of the query and/or answer. Like query blacklist entries, pattern rules may be used to specify queries for which answers should not be provided in the curated position. Alternately or in addition to matching literal query text, pattern rules may be used to match queries against any suitable pattern specification which may be used to parse a query in order to assess whether it matches a specified pattern. Non-limiting examples of pattern specifications include formal languages (e.g., regular expressions), patterns for checking whether a query contains, starts with, and/or ends with a particular string, patterns for recognizing dates, times, names, currency, etc., in a language/region-independent manner, etc. Pattern rules may be used to parse a query to find content in a query that may indicate the query should not be treated as a question for which query answer content should be provided in a curated position. Alternately or additionally, pattern rules may be used to parse an answer to a query, in order to determine whether the answer should be provided in a curated position. As a non-limiting example, a pattern rule may be configured to match one or more obscene phrases; accordingly, answers to queries containing any of the one or more obscene phrases and/or answers containing any of the one or more obscene phrases may be suppressed so they are not displayed in the curated position of search output. In some examples, a pattern rule may be assessed for query and/or answer. Alternately or additionally, a pattern rule may be designated to only be assessed for queries or for answers, e.g., so as to suppress answers that include obscene content while not suppressing answers to a query when the query itself includes obscene content.

Service endpoint 120 is configured to instantiate a site suppression machine 123 configured to assess site rules with regard to a query answer based on a plurality of site rules, e.g., loaded from rules store 150. Site rules are rules for suppressing a query answer based on metadata relating to a web site from which the answer is derived, and or content of the website. Metadata may include e.g., site URL, publication date/timestamps, authorship information, or any other suitable metadata. Site rules may be specified in a similar manner to pattern rules, e.g., by a formal language specification, text containment specification, etc. Moreover, site rules may be designated to apply to any textual data relating to a website (e.g., to apply to site URL, date/time info, authorship info, and other metadata) and/or to apply to particular data fields (e.g., a site rule may be designated to only apply to the site URL) so as to flexibly detect different aspects of answers that may indicate the answer is not desirable for inclusion in search results in a curated/prominent position. As an example, some sites may be associated with low-quality answers and/or duplicate answers that are already provided by other sites. Accordingly, a site rule may match such sites (e.g., by matching a URL) so as to suppress answers derived from such sites from search output.

In some examples, entries in the query blacklist and/or filtering rules (e.g., site rules and pattern rules) may be at least partially based on user feedback. For example, the search page may be configured to include additional user interface elements for receiving user approval and/or disapproval signals regarding the propriety of including a particular answer in search output. As an example, search output could include a "thumbs up" approval button and a "thumbs down" disapproval button for rating a query answer included in the curated position. As another example, client computer 110 may be configured to receive verbal feedback from a user in the form of speech audio and to interpret user approval/disapproval based on the feedback. For example, client computer 110 may present a query answer in the form of speech audio and prompt the user with a question, e.g., "Was that helpful?". Accordingly, the user may respond by saying "Yes" or "No" (or any other suitable response indicating whether or not the query answer was helpful). Accordingly, client computer 110 may capture speech audio (e.g., using a microphone) and process the captured speech audio to interpret "Yes" as approval and "No" as disapproval. In some examples, if a user disapproval signal is received for a query, the query may be added to the query blacklist responsive to receiving the user disapproval signal, so that answers will not be included for that query. In some examples, if a threshold number of user disapproval signals are received for answers generated from the same site, a new site rule may be added to the filtering rule list to match a site from which the query answers were derived, so as to suppress results from that site in the future. In some examples, a plurality of user disapproval signals may be received pertaining to one or more queries. Accordingly, a new pattern rule may be added to the filtering rule list, wherein the new pattern rule is configured to match any subsequently received query that is consistent with the one or more queries. As an example, the new pattern rule may be configured as a regular expression that matches the one or more queries. In some examples, the new pattern rule may be configured to match the one or more queries, while being constrained to match as few unrelated other queries as possible. For example, the pattern may be a regular expression that consists of one alternative literal string for each of the one or more queries, so that the regular expression would only match the one or more queries without matching any other, distinct queries. In some examples, the new pattern rule may be a rule based on matching strings that start with, contain, and/or end with a string or sub-pattern common to the one or more queries. Determining new pattern rules may be based on any suitable state-of-the-art and/or future string processing, parsing, natural language, and/or machine learning techniques. New query blacklist entries, pattern rules, and/or site rules may be added based on any suitable processing of user signals, e.g., based on data mining user approval and/or disapproval signals using artificial intelligence, machine learning, and/or natural language processing techniques. Changing the query blacklist and/or filtering rules based on user signals may be performed for any population of one or more users, e.g., to perform personalized suppression for a small population of users and/or to improve results of suppression for a general population of users. In examples where users can indicate disapproval and approval, determining whether to add new rules to suppress query answer content may be based on weighing disapproval vs. approval in the user population.

At 1400, method 1000 includes receiving a query. The query may be received in any suitable fashion, e.g., as a raw and/or normalized query received at service endpoint 120 over a computer network from client computer 110. The query may be based on user input, e.g., input in a search box of a graphical browser 111 presented by client computer 110, and/or input in a spoken dialogue with an intelligent assistant program running on client computer 110. In some examples, the query may be normalized before the query is received, e.g., at client computer 110. In some examples, the query may be received as a raw query and normalized after reception, e.g., at service endpoint 120.

At 1500, after receiving the query, method 1000 includes dynamically suppressing content from search results based on the query and search results. At 1510, method 1000 includes operating the query-answer mapping to map the query to a candidate query answer. Although the present description is with regard to retrieving a single candidate query answer for a query and determining whether to suppress the candidate query answer, the methodology described herein is not so limited and may be applied to assess suppression of multiple different candidate query answers for a query. For example, instead of operating the query-answer mapping to map a query to a single candidate query answer, retrieving the search results may include operating the query-answer mapping to map a query to a plurality of different candidate answers, and for each candidate answer, assessing whether to suppress the candidate answer according to the present disclosure. Accordingly, search results may include more than one candidate answer (if more than one candidate answer is not suppressed). Alternately or additionally, when more than one candidate answer is not suppressed, candidate answers which were not suppressed may be ranked, filtered, and/or otherwise processed to select a single candidate answer for inclusion in the curated position within search results. In some examples, suppression of a result entry that would be shown in a curated position may include removing the result entry from the curated position, e.g., by demoting the result entry to be shown in a different position without as much prominence. In other examples, suppression of a result entry may include removing the result entry altogether, so that it is not shown among the search results at all.

At 1520, method 1000 includes dynamically suppressing the candidate query answer from search results in the curated position, responsive to the candidate query answer matching any suppression rule. In an example, determining whether the query answer matches any suppression rule may be assessed using a method 2000 which will be described below with regard to FIG. 2. At 1530, method 1000 includes returning the search results. The search results may include main search results (e.g., main results 113 as shown in FIG. 1A). Optionally, in some examples, method 1000 includes recognizing a computer-readable entity description (e.g., an entity description received from entity description provider 160, and/or an entity description recognized in any other suitable fashion, e.g., based on processing data. at service endpoint 110), based on the query mentioning the entity. The returned search results are configured to further include the candidate query answer, in the curated search position for query answers, responsive to the candidate query answer not being dynamically suppressed.

Service endpoint 120 may be configured to dynamically suppress query answers based on matching one or more different suppression rules. FIG. 2 shows a non-limiting example of a method 2000 for determining whether to suppress a query or an answer based on a pipeline of suppression rules. As shown in FIG. 2, method 2000 includes checking the query and answer against a plurality of different suppression rules, and suppressing the query or answer if it matches any of the suppression rules. Although FIG. 2 shows a method 2000 with suppression rules 2100, 2200, 2300, and 2400 being assessed in order, suppression rules may be assessed in any suitable order (e.g., in parallel).

At 2100, method 2000 includes checking whether the computer-readable representation of the received query matches any computer-readable representation of any blacklisted query from the query blacklist (e.g., as described above with regard to the query blacklist store 140 and query suppression machine 121 shown in FIG. 1A). If the received query does match a blacklisted query, method 2000 includes suppressing the query at 2540. Otherwise, method 2000 may include assessing further suppression rules (e.g., suppression rules at 2200, 2300, and 2400).

At 2200, method 2000 includes checking whether or not the computer-readable representation of the query matches any pattern rule in the filtering rule list (e.g., a pattern rule received from rules store 150 and assessed with regard to the query by pattern suppression machine 122 as shown in FIG. 1A). If the received query does match a pattern rule, method 2000 includes suppressing the query at 2540. Otherwise, method 2000 may include assessing further suppression rules suppression rules at 2100, 2300, and 2400).

At 2300, method 2000 includes checking whether or not a computer-readable representation of metadata for the candidate query answer matches a site rule from the filtering rule list (e.g., a pattern rule received from rules store 150 and assessed with regard to the query by pattern suppression machine 122 as shown in FIG. 1A). If the received query does match a pattern rule, method 2000 includes suppressing the candidate query answer at 2540. Otherwise, method 2000 may include assessing further suppression rules (e.g., suppression rules at 2100, 2200, and 2400).

At 2400, method 2000 includes checking whether or not the candidate query answer is substantially similar to a computer-readable entity description (e.g., when the computer-readable entity description is scheduled for inclusion among search results). Determining substantial similarity may be based on assessment by a duplicate content suppression machine 124 as shown in FIG. 1A. If it is, method 2000 includes suppressing the candidate query answer at 2540. Otherwise, method 2000 may include assessing further suppression rules (e.g., suppression rules at 2100, 2200, and 2300). Alternately or additionally, at 2400, method 2000 may include checking whether or not the candidate query answer is substantially similar to any other portion of search results, e.g., whether or not the candidate query answer is substantially similar to a top result among the main search results. Assessing substantial similarity between a candidate query answer and other result entries may be performed in any suitable manner, e.g., using text/string matching techniques (e.g., edit distance), natural language processing machines and/or machine learning techniques, and/or according to a method 4000 for assessing similarity between two pieces of search content. For example, assessing similarity between a candidate query answer and a computer-readable entity description received from entity description provider 160 may include operating a natural language processing machine to assess a natural language similarity of the candidate query answer to the computer-readable entity description. If the candidate query answer is similar to the entity description, method 2000 further includes suppressing the query answer content at 2540. Otherwise, method 2000 may include assessing further suppression rules (e.g., suppression rules at 2100, 2200, and 2400).

If none of the suppression rules (e.g., at 2100, 2200, 2300, and/or 2400) result in suppression of query answer content at 2540, then at 2520, the query answer content is not suppressed and instead is included in search output, in a curated position within search results having enhanced prominence over other result entries.

Figure 3A:
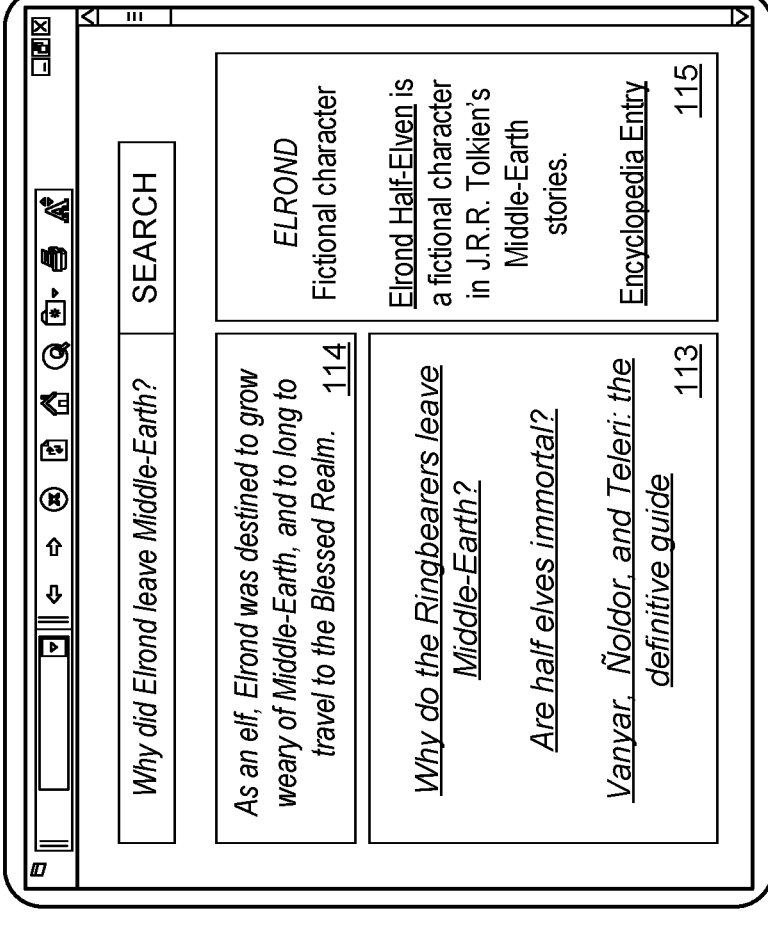

In some examples, if a candidate query answer is similar to an entity description, one or the other of the candidate query answer or the entity description may be suppressed from search results, depending on how the search results are to be used. FIG. 3A shows an example in which no search answer is suppressed. FIGS. 3B-3C show examples in which either the candidate query answer or the entity description is suppressed. Although FIGS. 3A-3C show examples of possibly suppressing results based on a similarity between a candidate answer and an entity description, results may be suppressed in a similar fashion to present desired search result content using any other suppression rule(s), e.g., based on site rules assessed by site suppression machine 123 of FIG. 1A, pattern rules assessed by pattern suppression machine 122, query matches in a query blacklist as assessed by query suppression machine 121, and/or similarity of content as shown.

In FIG. 3A, a web browser shows results for a search query, "Why did Elrond leave Middle-Earth?". The curated content location shows a query answer 114 to the question in the search query. Furthermore, entity description 115 shows a description of the character "Elrond" who is mentioned in the question. Furthermore, main results 113 may indicate (e.g., link to and/or summarize) potentially relevant content. In FIG. 3A, the query answer 114 is not substantially similar to the content in entity description 115. For example, the entity description is a general description of "Elrond" whereas the query answer is a specific answer to a question about "Elrond," and the corresponding text for the entity description and the query answer do not have very many common words/phrases (e.g., besides "Elrond" and "Middle-Earth" the content is substantially different).

In some examples, the candidate query answer may be dynamically suppressed from search results in the curated position, responsive to the candidate query answer being substantially similar to the computer-readable entity description. For example, FIG. 3B shows another example search with a different query—"Why is Elrond?". In this case, an answer to the question "Who is Elrond?" would include a description of "Elrond," and thus would be substantially similar to the entity description for "Elrond." Accordingly, the search results may be configured to suppress the query answer and to present the entity description in a second, different curated position (other than the curated position for the query answer) having enhanced prominence over other result entries. In an example, a user may be in a habit of checking a curated position for an entity description to find descriptions of entities such as people and fictional characters. By presenting the entity description instead of the query answer, the user may more easily find the relevant information. In some examples, when a query answer is suppressed due to similarity to an entity description, the entity description may he presented in the curated position for the query answer instead of in a different curated position for the entity description. For example, the curated position for the query answer may be even more prominent than the curated position for the entity description (e.g., the curated position for the query answer may be given more space, and/or a more central placement than the curated position for the entity description). Accordingly, when the query answer is suppressed, the entity description may be given additional prominence by presenting the entity description in the more prominent curated location that would otherwise be used for the query answer.

In other examples, the entity description may be dynamically suppressed from the search results responsive to the candidate query answer being substantially similar to the entity description, and the candidate query answer may accordingly not be suppressed from the search results. For example, FIG. 3C shows the same search as FIG. 3B, but the query answer 114 is presented instead of the entity description 115. In an example, a search interface may have a ciliated position for query answers while not having a curated position for entity descriptions. For example, although FIG. 3B depicts a search in a graphical web browser, in some examples, search results are configured for output via a speaker as an audio response including spoken recitation of one or more search results. Accordingly, the query answer may be more appropriate for spoken recitation than other entries among the search results (e.g., result entries in main results 113 and/or an entity description), e.g., because the query answer may be formulated as a natural language answer that is directly responsive to a question posed in a query.

Figure 4:
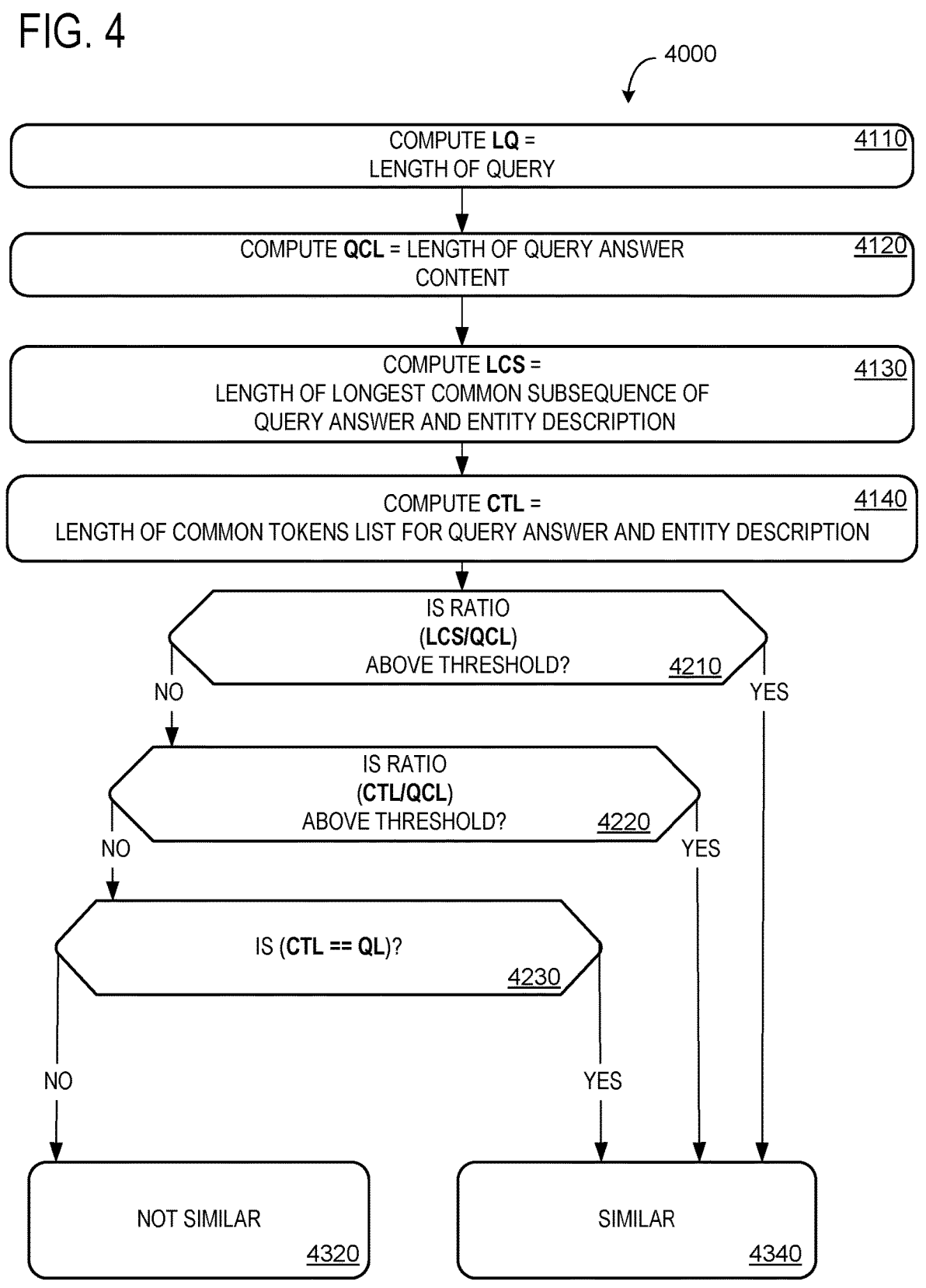
FIG. 4 shows a method of determining whether to suppress a query answer based on similarity to an entity description provided within search results.

FIG. 4 shows a non-limiting example of a method 4000 for assessing similarity of two pieces of search result content, e.g., for assessing substantial similarity between a query answer and an entity description. For example, method 4000 may be used for recognizing a computer-readable entity description for the query, assessing whether the candidate query answer is substantially similar to the computer-readable entity description, and further dynamically suppressing one of 1) the computer-readable entity description or 2) the candidate query answer from the search output based on the assessment. The assessment of similarity is based on the length of the query (LQ, e.g., a length of the text character tokens in the raw query) as computed at 4110, the length of the query answer content (QCL, e.g., a length of the text character tokens in the query answer) as computed at 4120, the length of the longest common subsequence of the query answer and the entity description (LCS, e.g., a number of tokens in the subsequence, e.g., represented as text character tokens and/or natural language word tokens indicating words in the subsequence) as computed at 4130, and the length of a list of common tokens present in both the query answer and the entity description (CTL, e.g., the number of common tokens in the common token lists) computed at 4140.

At 4210, method 4000 includes determining whether a ratio of the length of the longest common subsequence (LCS) to a length of the pre-processed query answer content (QCL), e.g., LCS/QCL, exceeds a predefined threshold. If LCS/QCL exceeds the predefined threshold, the query answer and entity description are assessed to be substantially similar.

At 4220, method 4000 includes determining whether a ratio of the length of the list of common tokens (CTL) to the length of the pre-processed query answer content (QCL) exceeds a predefined threshold (which may be the same or a different threshold as used at 4120). If CTL/QCL exceeds the predefined threshold, the query answer and entity description are assessed to be substantially similar.

At 4230, method 4000 includes determining whether the length of the list of common tokens (CTL) present in both the entity description and the pre-processed query answer content exceeds a length of the query (LQ). If CTL>LQ, the query answer and entity description are assessed to be substantially similar.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 500 may include any combination of logic subsystems, storage subsystems, and/or other subsystems of one or more of client computer 110, service endpoint 120, search results provider 130, query blacklist store 140, rules store 150, entity description provider 160, and/or query-answer data store 170.

Computing system 500 includes a logic subsystem 502 and a storage subsystem 504. Computing system 500 may optionally include an input/output subsystem 506 (e.g., comprising one or more input devices or sensors, and one or more output devices such as a graphical display and/or audio speakers), communication subsystem 508, and/or other subsystems not shown in FIG. 5.

Logic subsystem 502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to hardware and any software, instructions, and/or other components cooperating with such hardware to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., computer service) cooperating with a remote component (e.g., cloud computing service). The software and/or other instructions that give a particular machine its functionality may optionally be saved as an unexecuted module on a suitable storage device. Non-limiting examples of machines which may be instantiated by computing system 500 according to the present disclosure include browser 111, query suppression machine 121, pattern suppression machine 122, site suppression machine 123, and/or duplicate content suppression machine 124.

Machines according to the present disclosure may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process. For example, machine learning training techniques may be used to mine user approval/disapproval signals, e.g., to determine whether to add new query blacklist entries, site rules, and/or pattern rules for suppressing query answers.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

The methods and processes disclosed herein rriay be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected when the user provides affirmative consent. If data is to be collected, it can and should be collected with the utmost respect for user privacy. If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, performance is improved with regard to the user experience of the users and/or populations of users.

For example, a dialogue system according to the present disclosure may be trained to interact with different populations of users, using language models that are trained to work well for those populations based on language, dialect, accent, and/or any other features of speaking style of the population.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components can and should be designed to provide context as to how they operate as much as is possible, so that implementers of ML and/or AI systems can be accountable for decisions/assessments made by the systems. For example, ML and/or AI systems should have replicable behavior, e.g., when they make pseudo-random decisions, random seeds should be used and recorded to enable replicating the decisions later. As another example, data used for training and/or testing ML and/or AI systems should be curated and maintained to facilitate future investigation of the behavior of the ML and/or AI systems with regard to the data. Furthermore, ML and/or AI systems can and should be continually monitored to identify potential bias, errors, and/or unintended outcomes.

When included, input/output subsystem 506 may be used to present a visual representation of data held by storage subsystem 504. This visual representation may take the form of a graphical user interface (GUI). Input/output subsystem 506 may include one or more display devices utilizing virtually any type of technology. In some implementations, input/output subsystem 506 may include one or more virtual-, augmented-, or mixed reality displays. Input/output subsystem 506 may be used to visually present content, such as browser 111 and search results displayed in pages of browser 111. Input/output subsystem 506 may include one or more microphone and/or speaker devices configured to receive aid/or output audio. In some examples, microphone devices may be used to receive speech audio input which may be processed using natural language processing and/or machine learning techniques) to receive user queries, determine user intent, etc. For example, speech audio input may be processed to control browser 111. For example, speech audio input may be processed to recognize user queries for a search engine, e.g., in addition or instead of user input via text in a search bar 112. In some examples, speaker devices may be used to output speech audio, e.g., to provide information to the user, interact with the user in spoken conversation, etc. In some examples, browser 111 may be configured to present content in the form of speech audio. For example, browser 111 may present search results by outputting, for each result entry in the search results, speech audio indicating the result entry. For example, when browser 111 presents search results including a query answer and a plurality of other result entries, browser 111 may output speech audio reciting the query answer, and output further speech audio listing a title and/or summary of each of the plurality of other result entries.

When included, input/output subsystem may further comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 508 may be configured to communicatively couple computing system 500 with one or more other computing devices. Communication subsystem 508 may include wired and/or wireless communication devices compatible with one or more different communication protocols. The communication subsystem may be configured for communication via personal-, local- and/or wide-area networks.

Language models may utilize vocabulary features to guide sampling/searching for words for recognition of speech. For example, a language model may be at least partially defined by a statistical distribution of words or other vocabulary features. For example, a language model may be defined by a statistical distribution of n-grains, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or kluge machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g.., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

In an example, a method for determining whether to dynamically suppress a candidate query answer designated for inclusion in search results comprises: maintaining a query-answer mapping including, for each of a plurality of anticipated queries, a corresponding answer to the anticipated query; instantiating a plurality of filtering rules for assessing suppression of any candidate query answer, the plurality of filtering rules including one or both of a pattern rule and a site rule; maintaining a query blacklist including a plurality of computer-readable representations of black-listed queries; receiving a query; recognizing a computer-readable entity description for the query; after receiving the query: operating the query-answer mapping to retrieve a candidate query answer previously associated with the query; dynamically suppressing the candidate query answer from a curated position having enhanced prominence within search results relative to a plurality of other result entries responsive to any of: a computer-readable representation of the query matching a computer-readable representation of a blacklisted query from the query blacklist; 1) a computer-readable representation of the query matching a pattern rule from the filtering rule list; 2) a computer-readable representation of metadata for the candidate query answer matching a site rule from the filtering rule list; or 3) the candidate query answer being substantially similar to the computer-readable entity description; and returning the search results, the search results including the computer-readable entity description and further including the candidate query answer in the curated position responsive to the candidate query answer not being dynamically suppressed. In this or any other example, the method further comprises receiving a user disapproval signal pertaining to a query and adding the query to the query blacklist responsive to receiving the user disapproval signal. In this or any other example, the method further comprises receiving a plurality of user disapproval signals pertaining to one or more queries and adding a pattern rule to the filtering rule list, the pattern rule configured to match any subsequently received query consistent with the one or more queries. In this or any other example, assessing substantial similarity of the candidate query answer to the computer-readable entity description includes determining that a ratio of A) a length of a longest common subsequence between the entity description and the pre-processed answer, to B) a length of the pre-processed answer, exceeds a predefined threshold. In this or any other example, assessing substantial similarity of the candidate query answer to the computer-readable entity description includes determining that a ratio of A) a length of a list of common tokens between the entity description and the pre-processed answer, to B) a length of the pre-processed answer, exceeds a predefined threshold. In this or any other example, assessing substantial similarity of the candidate query answer to the computer-readable entity description includes determining that A) a length of a list of common tokens between the entity description and the pre-processed answer equals B) a length of the query. In this or any other example, assessing substantial similarity of the candidate query answer to the computer-readable entity description includes operating a natural language processing machine to assess a natural language similarity of the candidate query answer to the computer-readable entity description. In this or any other example, a site rule is configured to match a web site based on one or more of a timestamp of the website, a URL of the website, metadata of the website, and content of the website. In this or any other example, a pattern rule is configured to match a query based on parsing the query according to a regular expression specification. In this or any other example, a pattern rule is configured to match a query based on one or more of the query starting with a textual pattern, ending with the textual pattern, and containing the textual pattern.

In an example, a method for determining whether to dynamically suppress a candidate query answer designated for inclusion in search results comprises: instantiating a plurality of filtering rules for assessing suppression of any candidate query answer, including one or both of a pattern rule and a site rule; receiving a query; after receiving the query: retrieving a candidate query answer previously associated with the query; dynamically suppressing the candidate query answer from a curated position having enhanced prominence within search results relative to a plurality of other result entries responsive to any of: 1) a computer-readable representation of the query matching a pattern rule from the filtering rule list; or 2) a computer-readable representation of metadata for the candidate query answer matching a site rule from the filtering rule list; and returning the search results, the search results including the candidate query answer in the curated position responsive to the candidate query answer not being dynamically suppressed. In this or any other example, the method further comprises recognizing a computer-readable entity description for the query, assessing whether the candidate query answer is substantially similar to the computer-readable entity description, and further dynamically suppressing one of 1) the computer-readable entity description or 2) the candidate query answer from search results based on the assessment. In this or any other example, the candidate query answer is dynamically suppressed from the curated position within search results responsive to the candidate query answer being substantially similar to the computer-readable entity description. In this or any other example, the search results are configured for presentation with the computer-readable entity description in a second, different curated position having enhanced prominence within search results relative to the plurality of other result entries. In this or any other example, the computer-readable entity description is dynamically suppressed from the curated position within search results responsive to the candidate query answer being substantially similar to the computer-readable entity description, and the candidate query answer is not suppressed from search results. In this or any other example, the search results are configured for output via a speaker as an audio response including spoken recitation of the candidate query answer.

In an example, a method for determining whether to dynamically suppress a candidate query answer designated for inclusion in search results comprises: instantiating a plurality of filtering rules for assessing suppression of any candidate query answer, including one or both of a pattern rule and a site rule; receiving a first query from a search application configured for query answering; after receiving the first query: retrieving a candidate query answer previously associated with the first query; dynamically suppressing the candidate query answer from a curated position having enhanced prominence within search results relative to a plurality of other result entries responsive to any of: 1) computer-readable representation of the query matching a pattern rule from the filtering rule list; or 2) a computer-readable representation of metadata for the candidate query answer matching a site rule from the filtering rule list; returning the search results including the candidate query answer in the curated position responsive to the candidate query answer not being dynamically suppressed; and receiving a second query from a graphical application having a privileged display area for visually presenting an entity description, wherein the second query is identical to the first query; after receiving the second query: recognizing a computer-readable entity description for the second query; retrieving the candidate query answer previously associated with the first query and the second query; dynamically suppressing the candidate query answer from the curated position having enhanced prominence within search results relative to the plurality of other result entries responsive to any of: 1) a computer-readable representation of the query matching a pattern rule from the filtering rule list; 2) a computer-readable representation of metadata for the candidate query answer matching a site rule from the filtering rule list for the site rule; or 3) the query answer being substantially similar to the computer-readable entity description; and returning search results including the entity description designated for visual presentation in the privileged display area, and further including the candidate query answer responsive to the candidate query answer not being dynamically suppressed. In this or any other example, the candidate query answer is dynamically suppressed from the curated position within search results responsive to the candidate query answer being substantially similar to the computer-readable entity description. In this or any other example, the search results for the first query are configured for output via a speaker as an audio response including spoken recitation of the candidate query answer. In this or any other example, the computer-readable entity description is dynamically suppressed from the curated position within search results responsive to the candidate query answer being substantially similar to the computer-readable entity description, and the candidate query answer is not suppressed from the search results.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. A method performed by a search engine for forming a search engine results page (SERP), the method comprising:
   receiving, by the search engine, a query from a client computing device operated by a user;
   identifying, by the search engine, a search result based upon the query;
   identifying, by the search engine, an instant answer for the query based upon the query;
   performing, by the search engine, a comparison between content of the instant answer and content of the search result;
   determining, by the search engine and based upon the comparison between the content of the instant answer and the content of the search result, that the instant answer is to be suppressed in the SERP that is to be returned to the client computing device; and
   based upon the determining that the instant answer is to be suppressed in the SERP, generating, by the search engine, the SERP for display on the client computing device, wherein the generated SERP includes the search result but foregoes including the instant answer.

2. The method of claim 1, further comprising:
   identifying an entity description based upon the query;
   determining, based upon at least one of the query or the entity description, that the entity description is to be suppressed in the SERP that is to be returned to the client computing device; and
   generating the SERP based further upon the determining that the entity description is to be suppressed in the SERP, wherein the generated SERP foregoes including the entity description.

3. The method of claim 1, further comprising:
   identifying an entity description based upon the query;
   determining, based upon at least one of the query or the entity description, that the entity description is to be included in the SERP that is to be returned to the client computing device; and
   generating the SERP based further upon the determining that the entity description is to be included in the SERP, wherein the generated SERP comprises the entity description.

4. The method of claim 1, wherein the instant answer for the query is mapped to the query in a computer-readable index, and further wherein identifying the instant answer for the query comprises identifying the instant answer in the computer-readable index based upon the query.

5. The method of claim 1, wherein determining, based upon the comparison between the content of the instant answer and the content of the search result, that the instant answer is to be suppressed in the SERP that is to be returned to the client computing device comprises determining that the instant answer is redundant with the search result.

6. The method of claim 1, wherein the search result is an entity description.

7. The method of claim 6, wherein determining, based upon the comparison between the content of the instant answer and the content of the search result, that the instant answer is to be suppressed in the SERP that is to be returned to the client computing device comprises determining that content of the instant answer is redundant with content of the entity description.

8. The method of claim 1, further comprising determining that the query is include in a query blacklist, wherein the instant answer is suppressed based upon the query being included in the query blacklist.

9. The method of claim 1, further comprising assessing the query with respect to a pattern rule, where the pattern rule identifies a query pattern, and further wherein the instant answer is suppressed based upon the query having the query pattern identified in the pattern rule.

10. The method of claim 1, further comprising assessing the instant answer with respect to a pattern rule, where the pattern rule identifies a pattern, and further wherein the instant answer is suppressed based upon content of the instant answer having the pattern identified in the pattern rule.

11. The method of claim 1, wherein the instant answer is derived from a website that has metadata assigned thereto, the method further comprising assessing the metadata of the website with respect to a site rule, where the site rule specifies the metadata, and further wherein the instant answer is suppressed based upon the metadata assigned to the website being specified in the site rule.

12. The method of claim 1, wherein the instant answer is derived from a website that includes content, the method further comprising assessing the content of the website with respect to a site rule, where the site rule specifies the content, and further wherein the instant answer is suppressed based upon the content of the website being specified in the site rule.

13. A computing system that is configured to generate a search engine results page (SERP), the computing system comprising:

a processor; and memory storing instructions that, when executed by the processor, cause the processor to perform acts comprising:

receiving, by a search engine and from a client computing device that is in network communication with the computing system, a query set forth by a user of the client computing device, wherein the query includes a question;

identifying, by the search engine, a search result based upon the query;

identifying, by the search engine, an instant answer for the query based upon the question;

performing, by the search engine, a comparison between content of the instant answer and content of the search result;

determining, by the search engine and based upon the comparison performed between the content of the instant answer and the content of the search result, that the instant answer is to be suppressed in the SERP that is to be returned to the client computing device;

based upon the determining that the instant answer is to be suppressed in the SERP, generating, by the search engine, the SERP for display on the client computing device, wherein the generated SERP includes the search result but does not include the identified instant answer; and transmitting the SERP to the client computing device for presentment on a display of the client computing device.

14. The computing system of claim 13, the acts further comprising:

identifying an entity description based upon the question;

determining, based upon at least one of the query or the entity description, that the entity description is to be suppressed in the SERP that is to be returned to the client computing device; and generating the SERP based further upon the determining that the entity description is to be suppressed in the SERP, wherein the generated SERP does not include the entity description.

15. The computing system of claim 13, the acts further comprising:

identifying an entity description based upon the question;

determining, based upon at least one of the query or the entity description, that the entity description is to be included in the SERP that is to be returned to the client computing device; and generating the SERP based further upon the determining that the entity description is to be included in the SERP, wherein the generated SERP comprises the entity description.

16. The computing system of claim 13, wherein determining, based upon the comparison performed between the content of the instant answer and the content of the search result, that the instant answer is to be suppressed in the SERP that is to be returned to the client computing device comprises determining that the content of the instant answer is redundant with the content of the search result.

17. The computing system of claim 13, wherein the search result is an entity description.

18. The computing system of claim 17, wherein determining, based upon the comparison performed between the content of the instant answer and the content of the search result comprises determining that content of the instant answer is redundant with content of the entity description.

19. The computing system of claim 13, wherein the instant answer is suppressed in the SERP based further upon at least one of a pattern rule or a site rule.

20. A computer-readable storage medium comprising instructions that, when executed by a processor, cause the processor to perform acts comprising:

receiving, by a search engine, a query from a client computing device operated by a user;

identifying, by the search engine, a search result based upon the query;

identifying, by the search engine, an instant answer for the query based upon the query;

performing, by the search engine, a comparison between content of the search result and content of the instant answer;

determining, by the search engine and based upon the comparison, that the content of the search result and the content of the instant answer are redundant;

determining, by the search engine and based upon the determining that the content of the search result and the content of the instant answer are redundant, that the instant answer is to be suppressed in a search engine results page (SERP) that is to be returned to the client computing device responsive to receipt of the query; and based upon the determining that the instant answer is to be suppressed in the SERP, generating, by the search engine, the SERP for display on the client computing device, wherein the generated SERP includes the search result but foregoes including the instant answer.

* * * * *